Aug. 24, 1965  F. G. STULLER ETAL  3,202,263
LOG DECK AND SEPARATOR
Filed Sept. 22, 1964  3 Sheets-Sheet 1
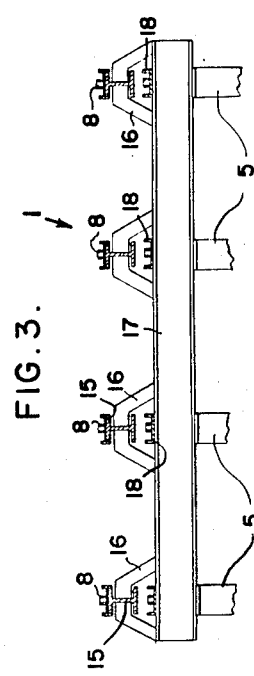
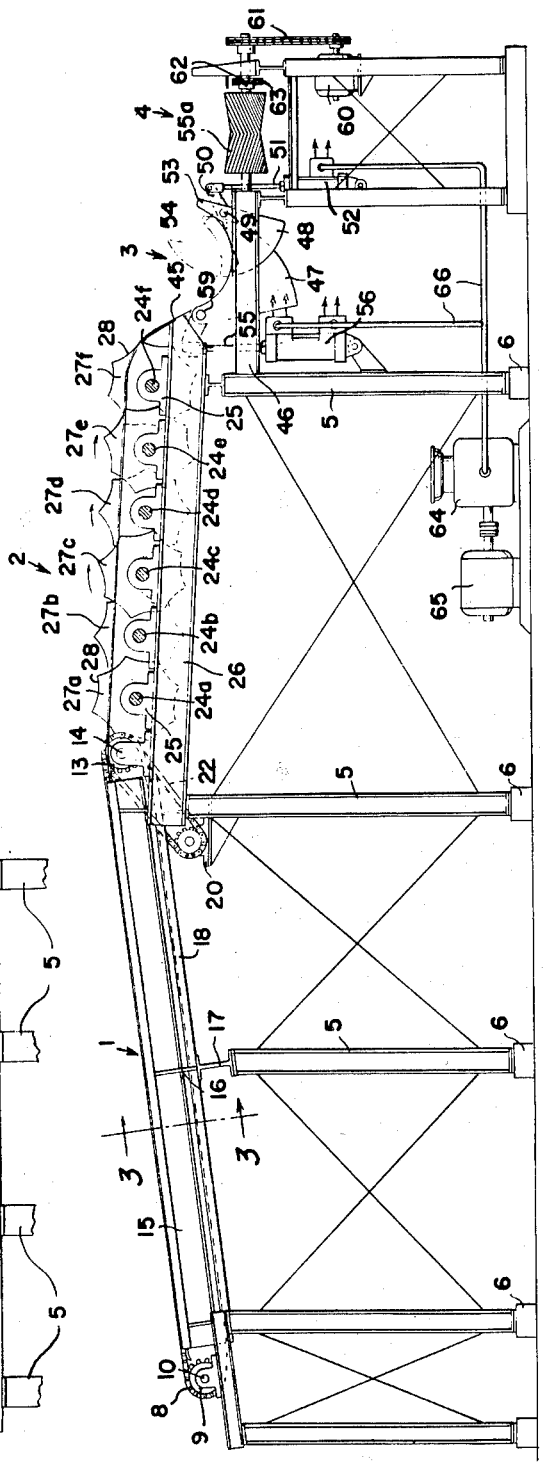
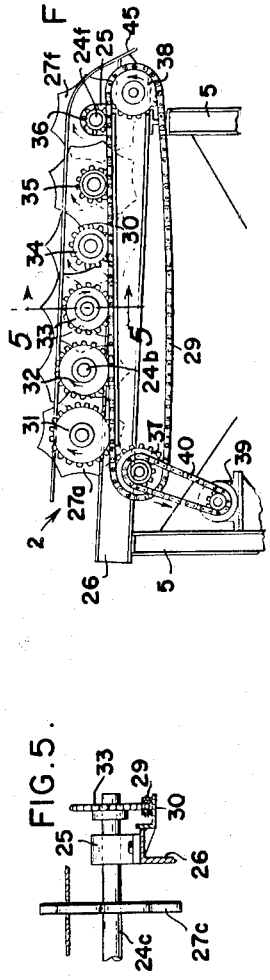

Aug. 24, 1965   F. G. STULLER ETAL   3,202,263
LOG DECK AND SEPARATOR
Filed Sept. 22, 1964   3 Sheets-Sheet 2

United States Patent Office 3,202,263
Patented Aug. 24, 1965

3,202,263
LOG DECK AND SEPARATOR
Frank G. Stuller, William H. Gumz, and Eugene J. Anderson, Milwaukee, Wis., assignors to Rex Chainbelt Inc., Milwaukee, Wis., a corporation of Wisconsin
Filed Sept. 22, 1964, Ser. No. 398,264
4 Claims. (Cl. 198—34)

This application is a continuation in part of pending United States application Serial No. 257,623 filed February 11, 1963 by the present inventors and entitled "Log Deck and Separator." This invention relates to apparatus for receiving unassorted logs as from a storage yard and for delivering the logs individually as required to a series of rolls which convey the logs endwise and individually. The roll conveyor is controlled by an operator who controls delivery of the logs to the mill for debarking or sawing into boards.

According to the present invention, a transfer deck includes a series of lobed wheels which operate to separate and transfer the logs from a receiving platform to a trough alongside the roll conveyor. The wheels are arranged so that only one log at a time generally reaches the trough and only two logs at the most will only occasionally be delivered to the trough.

A principal object of the invention is to provide apparatus capable of receiving a large stock of unassorted logs of random lengths and of separating the logs while advancing the same towards the trough so that the logs fall individually into the trough and are disposed lengthwise respecting the roll conveyor.

Another object is to provide improved log receiving and separating means which are rugged and reliable, and require a minimum of maintenance and rebuilding.

Another object is to provide reliable means for orienting and separating the logs so that they are lengthwise with respect to the direction of the rollers.

The drawings furnished herewith illustrate the best mode of carrying out the invention as presently contemplated and set forth hereinafter.

In the drawings:

FIGURE 1 is a side elevation of the receiving platform and the separating deck, and an end elevation of the receiving trough. The shafts of the separating deck are broken away and sectioned and the drive means is shown separately in another figure;

FIG. 3 is a section taken on line 3—3 of FIGURE 1 to show the transporting chains of the receiving platform;

FIG. 4 is a side elevation of the drive means of the transfer deck shown in plan in FIG. 2;

FIG. 5 is a section taken on line 5—5 of FIG. 4 to show the operation of the drive chain.

Figure 2:
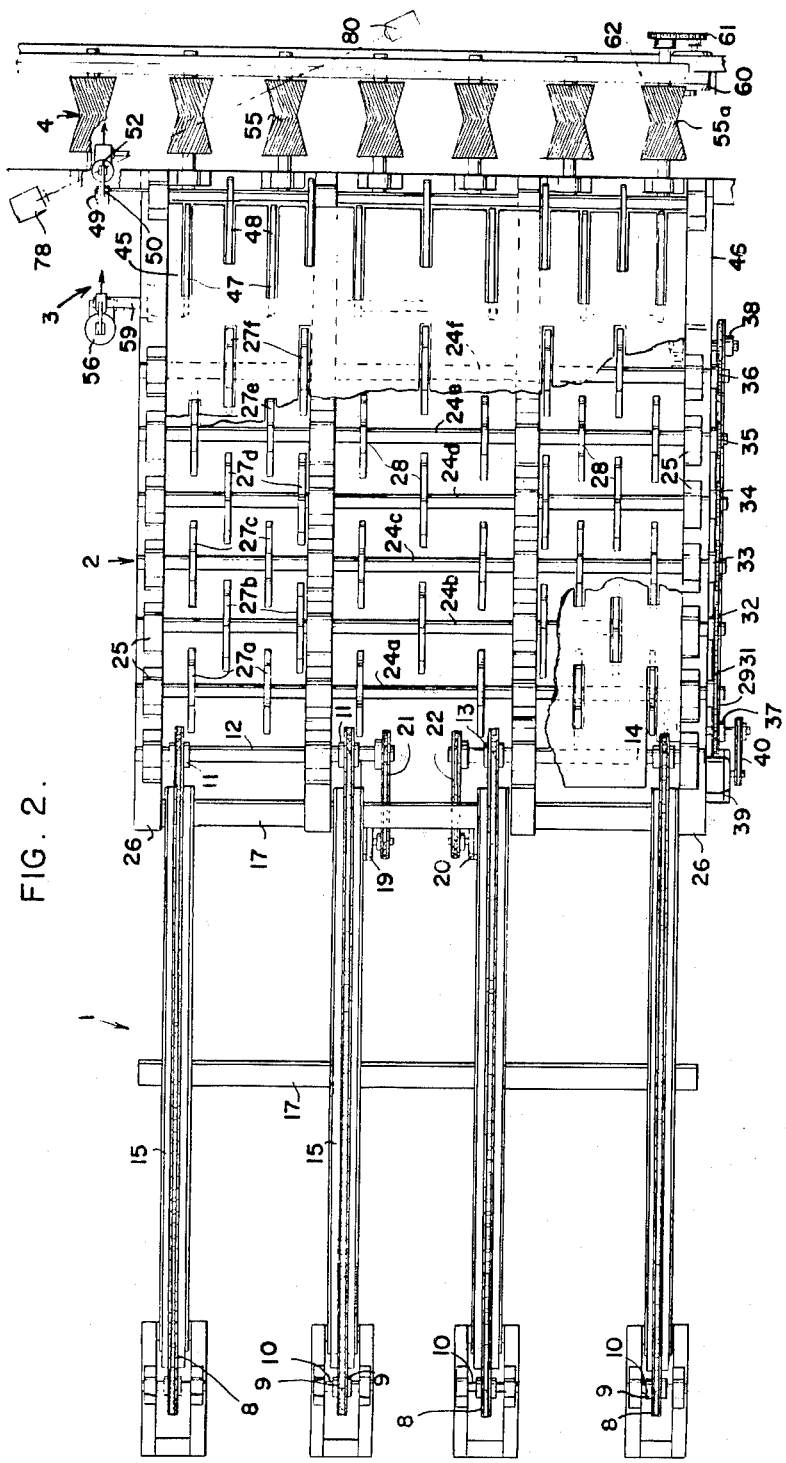
FIG. 2 is a plan view of the assembly shown in FIGURE 1 including the receiving platform, the separating deck with drive means, and the receiving trough.
Figure 6:
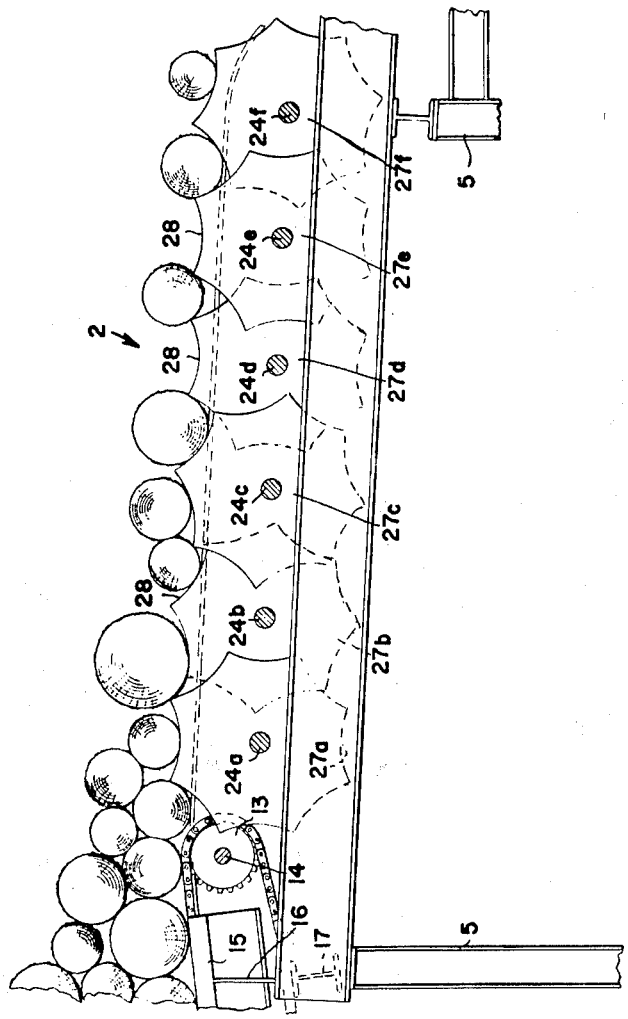
FIG. 6 is an enlarged side elevation of the separating deck showing the operation of the wheels and movement of the logs by the wheels.

The log-handling apparatus shown in the drawings comprises the receiving platform 1, the separating and transfer deck 2, the positioning trough 3, and the roll conveyor 4. The entire assembly is supported by the braced, structural-steel posts 5 on the concrete footings 6 at a height which is generally determined by the installation. The logs from the storage yard are of various lengths and sizes and are placed onto platform 1 by a crane, not shown, and in a pile which is moved toward deck 2 which takes the logs from the pile and separates them as they are transferred across the deck to the trough 3.

Photoelectric means responsive to the delivery of each log into trough 3 interrupts operation of the transfer deck and platform until the log is removed to conveyor 4 which delivers each log to a cut-off saw, not shown.

The operator of the cut-off saw controls the delivery of each log by the roll conveyor 4 and other photoelectric means responsive thereto prevents the removal of the log in the trough to the conveyor until the log on the conveyor has cleared the end of the trough.

The transfer deck 2 is unique by reason of the fact that it is capable of handling mixed logs including the smallest sizes which would be cut, and will separate them so that generally one log at a time is dropped into trough 3 and so that no more than two logs are at any time dropped into trough 3.

Platform 1 includes the several parallel carrier chains 8 operating over the tail sprockets 9 carried by shafts 10. The chains on one side of the centerline of platform 1 are driven by the head sprockets 11 carried by shaft 12 and the chains on the other side of the platform are driven by sprockets 13 carried by shaft 14. The upper runs of chains 8 are carried by the beams 15 supported by the trusses 16 above the cross-members 17. The lower runs of the chains are carried in the channels 18 supported on cross-members 17 beneath beams 15.

Shafts 12 and 14 are separately driven by the motors 19 and 20 respectively connected thereto by the chain drives 21 and 22. The logs placed on the platform rest on chains 8 which carry the logs to one end of the platform. The logs should be generally cross-wise of the platform and by selectively driving motors 19 and 20, as will be described, the pile of logs may be turned or adjusted as required.

Deck 2 which receives the logs from platform 1 includes the series of spaced parallel shafts 24 supported in the bearings 25 on the longitudinal frame members 26. Each shaft 24 carried a series of wheels or discs 27 having lobes 28 arranged in alignment so that the upper lobes form a log-carrying cradle which is adjacent and parallel to similar cradles formed by the wheels of the adjacent shafts.

The shafts 24 and wheels 27 are driven in the same direction by the chain 29 which runs on the rail 30 and in cycloidal engagement with the lower teeth of the several sprockets 31, 32, 33, 34, 35 and 36. Chain 29 operates over the sprockets 37 and 38 at the ends of rail 30 and is driven by the motor 39 and the chain drive 40 connected to sprocket 37.

In the operation of platform 1 and deck 2, the pile of logs on the platform is advanced toward the deck so that the forwardmost logs fall from chains 8 of platform 1 onto the wheels 27a adjacent the end of the platform and carried by the shaft 24 driven by sprocket 31. The peripheral speed of wheels 27a driven by sprocket 31 is slightly greater than the linear speed of chains 8 so that the wheels referred to pull away the forward part of the pile which may be a single log or logs side-by-side or may be a smaller pile several logs high.

Assuming first that a single log has rolled from the pile onto wheels 27a, the log enters the corresponding lobes of the several wheels 27a which are in alignment and the log is supported as in a cradle or trough which moves sidewise in an arc over the shaft 24a driven by sprocket 31. The log is carried on wheels 27a over shaft 24a and into engagement with the wheels 27b over shaft 24b and into engagement with the wheels 27c driven by sprocket 33. The log is similarly transferred to and between wheels 27d, 27e and 27f driven by sprockets 34, 35 and 36, respectively. Rotation of wheels 27f drops the log into trough 3 extending alongside deck 2 oppositely of platform 1.

The size and spacing of wheels 27 and number and depth of lobes 28 should be such that the largest logs to be handled are transferred across the deck. Similarly, if all of the logs are to be of the same size, the lobes could be just sufficiently larger to accommodate the logs and their separation would present no great problem.

Sprocket 31 is of a given size, or number of teeth, and is driven by motor 39 so that the peripheral speed of wheels 27a is slightly greater than the linear speed of chains 8 and the logs moving onto the wheels from the chains are pulled away from the pile of logs remaining on the chains. For separation of the logs, the logs are transferred across the deck at progressively increasing speeds which is accomplished by making sprockets 31 through 36 respectively progressively smaller in size. The corresponding differences in speed of wheels 27a through 27f effects a corresponding spacing in the logs as they are transferred across the deck. The number of wheels 27 determining the width of deck 2 should provide a spacing so that the logs approaching wheels 27f in no case remain piled but are all lying side-by-side on the wheels.

It is necessary and general that the logs have a diameter within upper and lower limits. Any undersized logs, or sticks, may be delivered to trough 3 which, according to the invention of the application of which this is a continuation in parte, comprises the trough member 45 and arms 47 and 48 for separating such sticks.

Shaft 49 carries arms 48 and is operated by crank 50 which is connected by rod 51 to the piston, not shown, operating in cylinder 52. Each plate 48 includes the arm 53 for delivery of the logs or sticks to rolls 55a of conveyor 4 and also the points 54 for separating two sticks which might be delivered to trough 3.

Plates 47 are rotated by rod 55 and piston 56 on shaft 59 to elevate sticks for their separation. Motor 60 through chain drive 61 and chain 62 rotates sprockets 63 to drive rolls 55a. The compressor 64 is driven by motor 65 and connected by lines 66 to pistons 52 and 56. Operation of trough 3 and conveyor 4 is controlled in part by the photo-cell switch 78 which is responsive to the light beam from light 80 as described in the copending application referred to.

Various modes of carrying out the invention are contemplated as being within the scope of the following claims particularly pointing out and distinctly claiming the subject matter which is regarded as the invention.

We claim:

1. Log handling apparatus having a receiving end and an opposite discharge end, comprising a frame having horizontal shafts arranged in a series parallel to and between said ends, a series of discs fixed to each shaft at spaced intervals and having aligned lobes, the upper lobes of the discs of each shaft forming cradles in which individual logs may be carried and transferred from trough to trough and from end to end of the apparatus, drive means operatively connected to said shafts to turn the same so that the peripheral speed of the discs and the movement of the cradle of each shaft nearer said discharge end is progressively faster toward said end whereby the different speeds of said lobes effects separation of the logs during transfer from said receiving end to said discharge end for individual delivery of the logs to other conveyor means or the like at the said discharge end.

2. Log handling apparatus having a receiving deck comprising a number of endless chain conveyors in spaced, parallel relation adapted to receive and carrying toward one end thereof the logs placed crosswise thereon, a frame having receiving and discharge ends with the receiving end adjoining the discharge end of said chain conveyors to receive the logs therefrom, a series of spaced horizontal shafts spaced and parallel to said ends, each shaft having a series of discs having aligned lobes, the discs of each shaft being intermediate the discs of the adjacent shafts, drive means connected to said shafts to turn the shafts so that the peripheral speed of the discs of each shaft nearer the discharge end of said frame is progressively faster than the shaft nearer the receiving end, said discs providing a series of cradles in which the logs are successively carried and transferred from the receiving to the discharge end of the frame and are separated so that individual logs are delivered from said discharge end.

3. In combination with log handling apparatus including means for receiving an assorted group of logs and for transferring the logs to one end of said means, a frame having horizontal shafts arranged in a series between the receiving and discharge ends of said frame, a plurality of discs fixed to the shafts at interspaced intervals, the discs of each shaft having aligned lobes such that the upper lobes of the discs of each shaft form cradles in which individual logs may be carried, drive means operatively connected to said shafts to turn the same so that the peripheral speed of the discs and the movement of the cradle of each shaft nearer said discharge end is progressively faster toward said end whereby the logs are transferred from trough to trough and from the receiving to the discharge end of the frame and the different speeds of said lobes effects separation of the logs during transfer for individual delivery of the logs to other conveyor means or the like at the said discharge end.

4. Log handling apparatus comprising a deck plate having a receiving end and an opposite discharge end, said deck plate having interspaced horizontal shafts arranged in a series parallel to and between said ends and journally supported beneath said plate, a set of discs fixed to each shaft at spaced intervals and projecting above said deck plate through the slots thereof, the discs of each shaft having aligned lobes so that the upper lobes of the discs of each shaft form cradles above the deck plate and in which individual logs may be carried, drive means operatively connected to said shafts to turn the same so that the peripheral speed of the discs and the movement of the cradle of each set of discs nearer said discharge end is progressively faster toward said end whereby the different speeds of said lobes effects the transfer and separation of the logs from said receiving end to said discharge end for individual delivery of the logs to other conveyor means or the like at the said discharge end.

References Cited by the Examiner
UNITED STATES PATENTS 1,299,198   4/19   Low _____ 198—34

SAMUEL F. COLEMAN, *Primary Examiner.*